United States Patent

Hummel et al.

[11] Patent Number: 6,045,445
[45] Date of Patent: Apr. 4, 2000

[54] DEVICE AND A METHOD OF SEPARATING SAUSAGES

[75] Inventors: Karl Hummel, Biberach; Klaus Schmid, Riedlingen, both of Germany

[73] Assignee: Albert Handtmann Maschinenfabrik GmbH & Co., Biberach, Germany

[21] Appl. No.: 09/217,344

[22] Filed: Dec. 21, 1998

[30] Foreign Application Priority Data

Jan. 21, 1998 [DE] Germany .......................... 198 02 101

[51] Int. Cl.⁷ .................................................. A22C 11/02
[52] U.S. Cl. ............................................... 456/46; 452/49
[58] Field of Search ................................ 452/46, 48, 49

[56] References Cited

U.S. PATENT DOCUMENTS

| 5,145,450 | 9/1992 | Staudenrausch et al. | ................ 452/46 |
| 5,145,451 | 9/1992 | Staudenrausch | .......................... 452/46 |

FOREIGN PATENT DOCUMENTS

| 0232 812 | 1/1987 | European Pat. Off. . |
| 440039 | 1/1991 | European Pat. Off. . |
| 3519021 | 11/1986 | Germany | ............................... 452/46 |
| 3617559 | 10/1987 | Germany . |

*Primary Examiner*—Willis Little
*Attorney, Agent, or Firm*—Tilton, Fallon, Lungmus & Chestnut

[57] ABSTRACT

A separation device for separating sausages at separation points, comprising at least one first separation element and one second separation element, which are driven so as to circulate in opposite directions on circular paths in such a way that, when circulating, they cooperate such that the sausage strand is cut through. The first separation element comprises a first forming element which circulates together therewith and which precedes the first separation element on its circular path, and that the second separation element comprises a second forming element which circulates together therewith and which follows the second separation element on its circular path, with the first and second forming elements holding the sausages to be separated at a desired distance. Through a corresponding method sausages can be separated at separation points and cut.

14 Claims, 6 Drawing Sheets

DEVICE AND A METHOD OF SEPARATING SAUSAGES

FIELD OF THE INVENTION

The present invention refers to a device for separating sausages at separation points formed between the sausages of a sausage strand, comprising at least one first separation element on a first side of the sausage strand and at least one second separation element on the second side of the sausage strand, said separation elements circulating in opposite directions on circular paths and being arranged such that, while circulating, said first and second separation elements cooperate in such a way that the sausage strand is cut through, and to a method of dividing sausage strands.

BACKGROUND OF THE INVENTION

A prior device is known, e.g. from EP 0440 039 B1. The stuffing machine described in said reference presses sausage meat through a charging pipe into a tubular sausage skin. By means of a twist-off mechanism, individual sausage portions are formed between which twist-off or separation points are located. The sausage strand formed in this way is advanced by two endless belts of a so-called dimensioning unit. In the course of this advance movement, the sausage strand passes a separation device which separates the individual sausages from one another at the twist-off points. In said device, rotating separation elements are provided for this purpose on either side of the sausage strand, said separation elements circulating on circular paths and including blades and corresponding countersupports, respectively, at the outer end thereof. The separation elements are supported such that the blades and countersupports co-operate at one point of their circular movement in such a way that the sausage strand is cut through at a twist-off point. The conveying speed of the sausage strand and the circulation speed of the separation elements are synchronized and adapted to the product.

In many cases, the sausages are, however, only separated by a very short twist-off point or they are even in full contact with one another. Especially when e.g. sausages in natural sausage casings are dealt with, it is not always possible to keep the twist-off points stretched. In these cases, the problem arises that the knives or countersupports would injure the stuffed sausages when they are brought into engagement with one another. It follows that the known device is not suitable for processing sausages in natural sausage casings.

SUMMARY OF THE INVENTION

It is therefore the object of the present invention to provide a device and a method of separating sausages at separation points with the aid of which sausages of a sausage strand, in particular also sausages in natural sausage casings, can reliably be separated independently of the respective nature of the separation points and without any risk of injuring the individual sausages.

In the case of the method according to the present invention, the sausage strand is moved into contact with a separation device and, in a simultaneous operating step, the separation point between two sausages is drawn apart to a desired distance and cut through. Since the individual sausages are drawn apart to a desired distance during the cutting process, a defined cut is possible. Also sausages which are in direct contact with one another in the sausage strand or which are only separated by a short separation point can precisely be separated by a cut in this way, without any risk of damage being caused to the sausage skin by the knife so that the claimed device is particularly suitable for processing sausages in natural sausage casings.

In the device according to the present invention first and second forming elements are provided for this purpose. The first forming element precedes the first separation element on the circular path thereof, whereas the second forming element follows the second separation element on the other side of the sausage strand on the circular path thereof. During engagement of the first and second separation elements, the forming elements keep the sausages to be separated at a desired distance from one another, while the first and second separation elements cut through the sausage strand at the separation point. The sum of the distances between the first forming element and the first separation element and between the second forming element and the second separation element defines the distance existing between two drawn-apart sausages of the sausage strand. This distance has to be chosen depending on the requirements to be met and the precision desired. Due to the fact that the forming elements are implemented such that they move together with the first and second separation elements, it is guaranteed that the desired distance is always established between two respective sausages while the two sausages are simultaneously separated from each other. Furthermore, the arrangement is very compact and the forming elements do not require any additional drive. An additional synchronization of the forming elements and of the corresponding separation elemens is not necessary due to fact that these components circulate in common.

If particularly precise cuts are desired, it will be advantageous when the first and the second separation element are implemented as blades. A particularly economy-priced embodiment, however, is so conceived that one separation element comprises a blade and that the respective other separation element on the other side of the sausage strand comprises a corresponding countersupport.

One embodiment of the present invention is so conceived that a concave indentation is provided on the leading side of the second separation element. The concave indentation is the first portion that comes into contact with the sausage strand and, due to its concave shape, it causes the individual sausages to be drawn apart reliably, without any risk of tearing of the sausage skin.

The individual separation elements can be fixedly connected to the rotating axle. According to an advantageous embodiment, one of the separation elements is, however, resiliently supported or elastic so that, when brought into engagement with the other separation element, it can yield in a direction opposite to the direction of circulation. This permits a smooth engagement of the first and second separation elements.

In accordance with one advantageous embodiment of the device according to the present invention, the forming elements comprise platelike elements which extend substantially parallel to the respective separation elements. Such platelike forming elements are easy to manufacture and represent an economy-priced possibility of realization.

The method according to the present invention will be particulary advantageous in cases where, in addition to the drawing apart of the sausage strand at the separation point, centering of said separation point is carried out. Especially when sausages in natural sausage casings are dealt with, it may easily happen that the separation point is off-centre so that said separation point is displaced relative to the longitudinal axis of the sausage strand. Centering of this separation point during the cutting process will increase the precision and reduce the risk of damage being caused to the sausage skin at an undesired point.

The device according to the present invention advantageously comprises for this purpose forming elements having essentially V-shaped centering areas, which open in the direction of the sausage strand, at their ends located remote from the axle, said centering areas causing the separation point to be centered during engagement of the first and second separation elements. Such V-shaped forming elements are easy to realize and cause the separation point to be, centered in a reliable manner.

A simple embodiment comprises respective one-piece forming elements. According to a further development of the device according to the present invention, the forming elements consist of adjustable centering vanes including a variable angle between them, said centering vanes defining the respective V-shaped centering area. Such centering vanes can be adjusted to the size of the sausage and, consequently, they offer a particularly flexible possibility of realizing the device in question.

In the case of a special embodiment, the drive means for the separation elements with the associated forming elements is speed-controllable during a circulation. The drive can then be so conceived that, in the area of engagement with the sausage strand, the separation elements move at a speed corresponding to the speed of the transport means for the sausage strand. In this way, the separation point is drawn apart and cut through without any shearing forces and with higher precision.

An arbitrary number of first separation elements can be provided, which circulate in common about one axle on one side of the sausage strand, a corresponding number of second separation elements circulating about a second axle on the other side of the sausage strand. However, a particularly advantageous embodiment is a device in which two separation elements are provided on either side of the sausage strand, said separation elements circulating about one axle, since such an arrangement permits a high speed of the separation process, without the individual separation elements on one side of the sausage strand impeding one another.

BRIEF DESCRIPTION OF THE DRAWINGS

One embodiment of the device according to the present invention and of the method according to the present invention will be explained in the following on the basis of the enclosed figures, in which FIG. 3b shows a top view of FIG. 3a, FIG. 4a shows a view of a second embodiment in the direction of movement of a sausage strand.

DESCRIPTION OF THE PREFERRED EMBODIMENT

Figure 5:
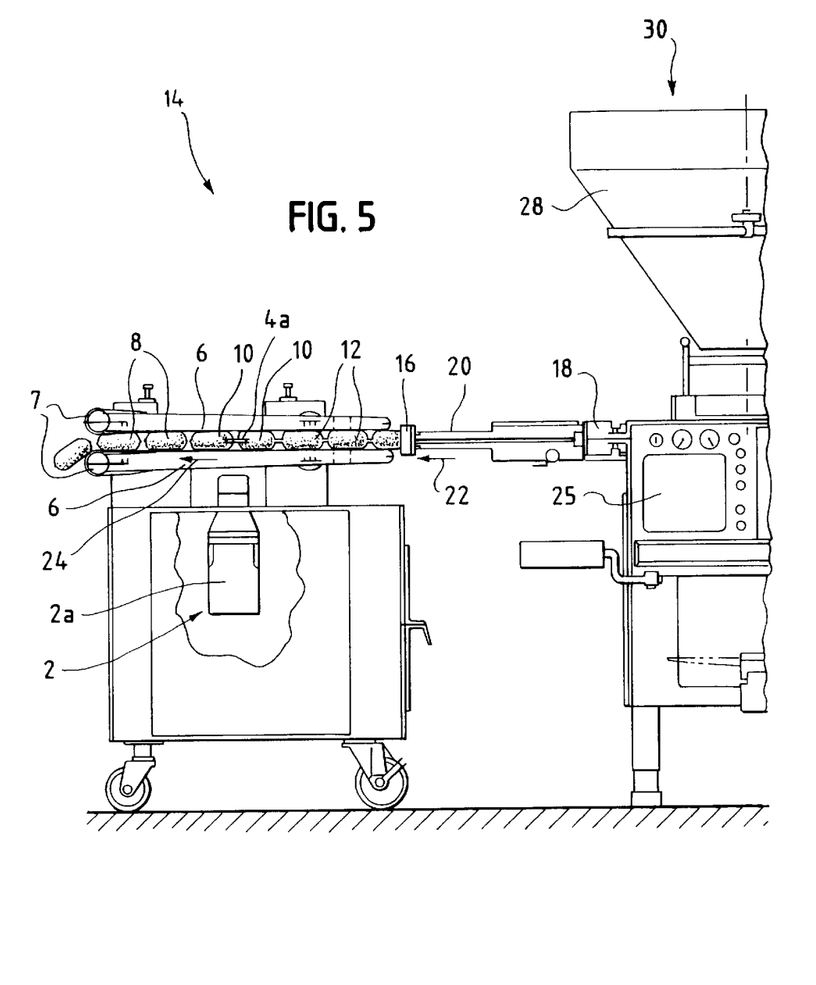
FIG. 5 shows a schematic overall view of a sausage stuffing machine with a separation device according to the present invention.

The overall view of a sausage stuffing machine in FIG. 5 shows a stuffing machine main unit 30 comprising a feed hopper 28 for the sausage meat. Reference numeral 20 designates a charging pipe through which the sausage meat is ejected in direction 22 in a known manner with the aid of a vane pump arranged in said stuffing machine main unit 30. Reference numeral 16 designates a brake ring mechanism of the type known e.g. from European patent 0232 812, which serves to decelerate the sausage skin. Reference numeral 18 designates a twist-off mechanism which is known and which is used for forming twist-off points between the individual sausages. Reference numeral 12 stands for individual sausages which are interconnected at the separation points, i.e. the twist-off points.

Reference numeral 2 designates a separation device provided with separation heads 4a, b, which will be described in detail in the following; in FIG. 5 only one separation head 4a can be seen. In the condition shown, two sausages 10 are just being separated. Reference numeral 2a designates a highly dynamic, speed-controllable motor driving the rotating separation heads 4a, b, which are located on both sides of the sausage strand. The separation heads 4a and 4b are driven by a common motor 2a of the separation device 2 via a transmission, the details of said transmission being not of interest in the present connection. It is also possible to use two separate motors for the separation elements. Reference numeral 8 designates two sausages which have already been separated. The sausage strand and sausages, respectively, are transported by two endless belts 6 in direction 24, the endless belts 6 being driven by pulleys 7. The endless belts with their drive means and the separation device in their entirety are collectively referred to as the dimensioning unit 14.

A control means 25 takes care that the phases of the movements of the separation device 2, of the endless belts 6, of the discharge of stuffing material through the charging pipe 20 and of the twist-off mechanism 18 are precisely coordinated. The phases of the individual movements are calculated by the control means 25 on the basis of parameters, such as the desired portion length, the stuffing speed, the size or the desired number of sausages, which are intended to form a sausage strand in common, and transmitted as predetermined values.

Figure 6:
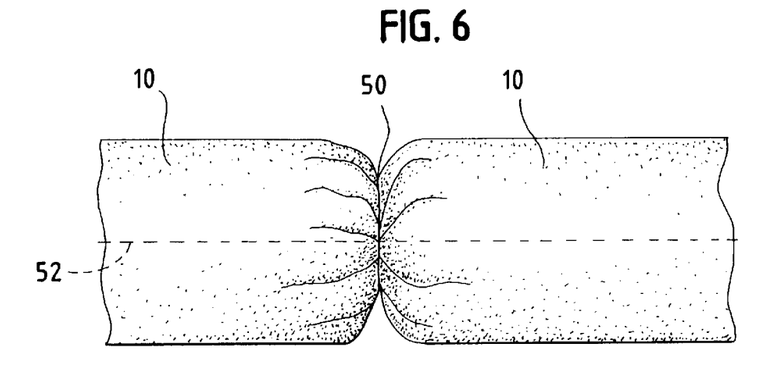
FIG. 6 shows a detail of a sausage strand.
Figure 7:
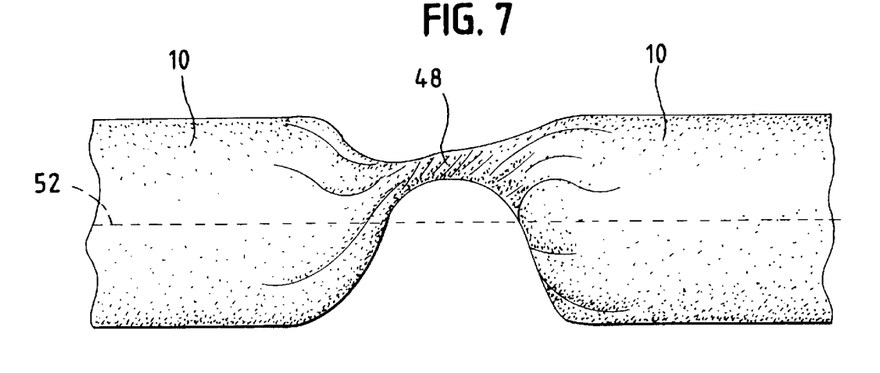
FIG. 7 shows a detail of another sausage strand.

FIG. 6 shows the area of a separation point 50 between two sausages 10, the distance between the two sausages at the separation point being too short. Reference numeral 52 designates the longitudinal axis of the sausages. FIG. 7 shows part of another sausage strand with an off-center separation point 48.

Figure 1A:
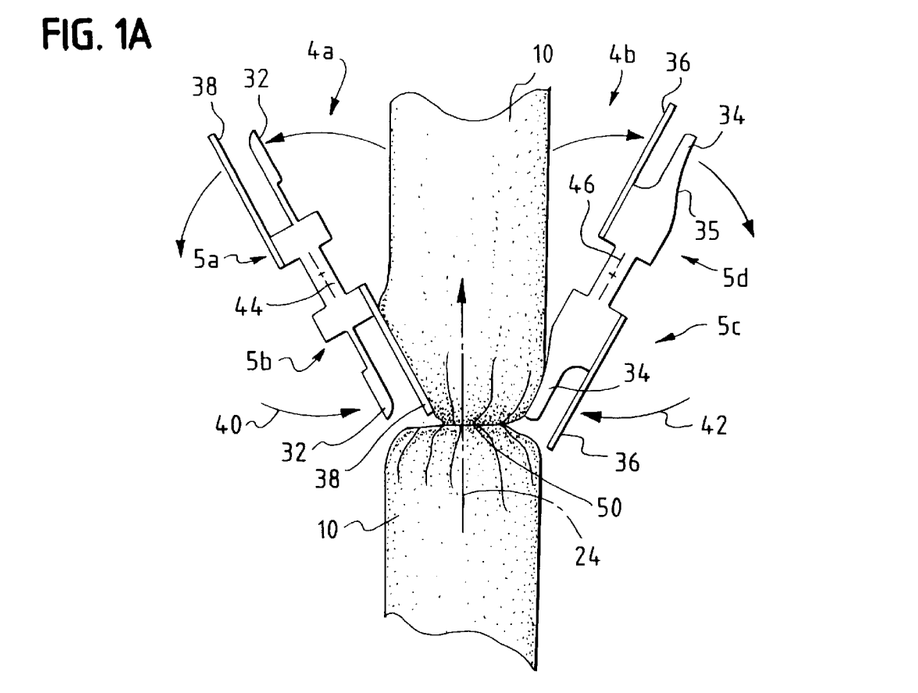
FIG. 1a shows a top view of a detail of a separation device at the moment at which engagement with the sausage strand begins.
Figure 1B:
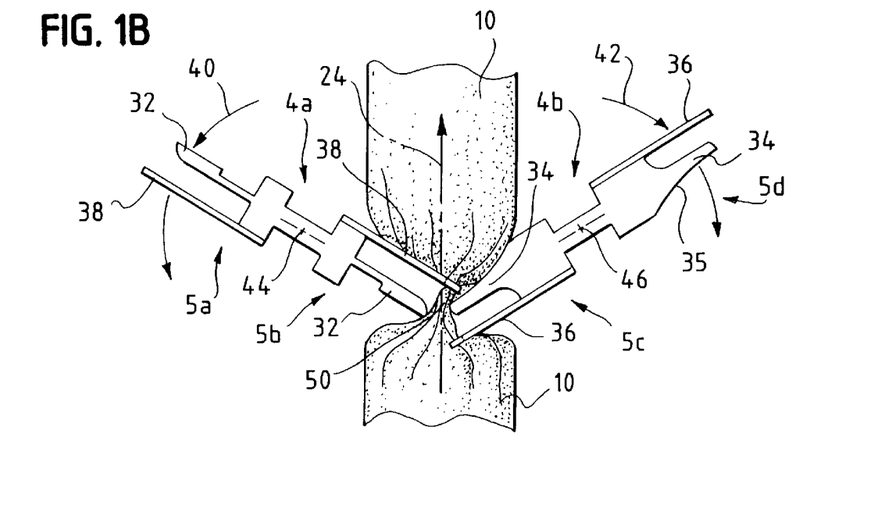
FIG. 1b shows a top view of the same detail at a later time.
Figure 1C:
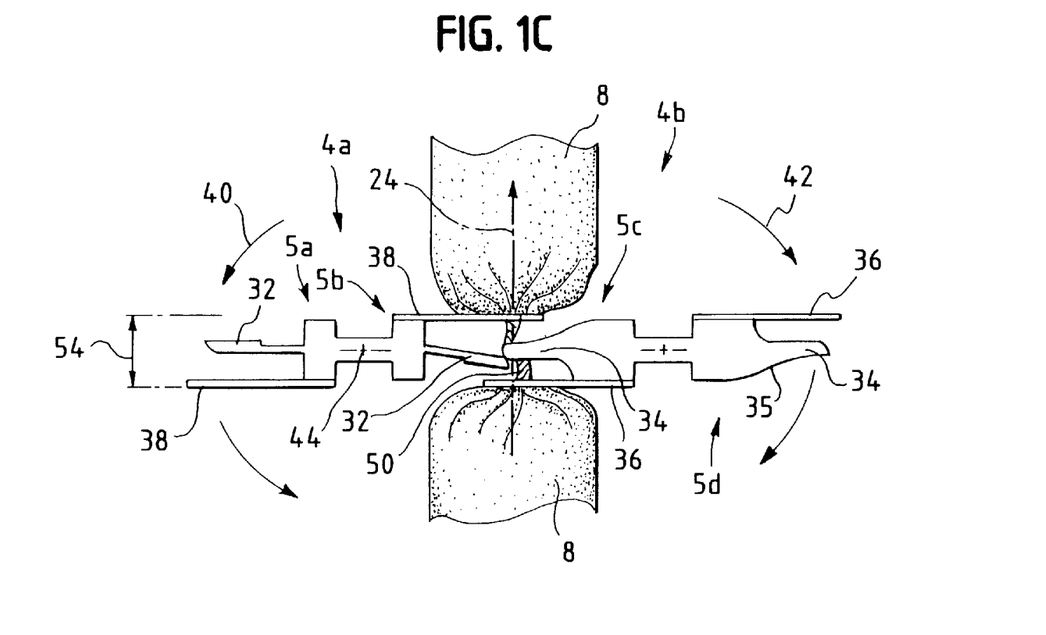
FIG. 1c shows a top view of the same detail at a still later time.
Figure 2A:
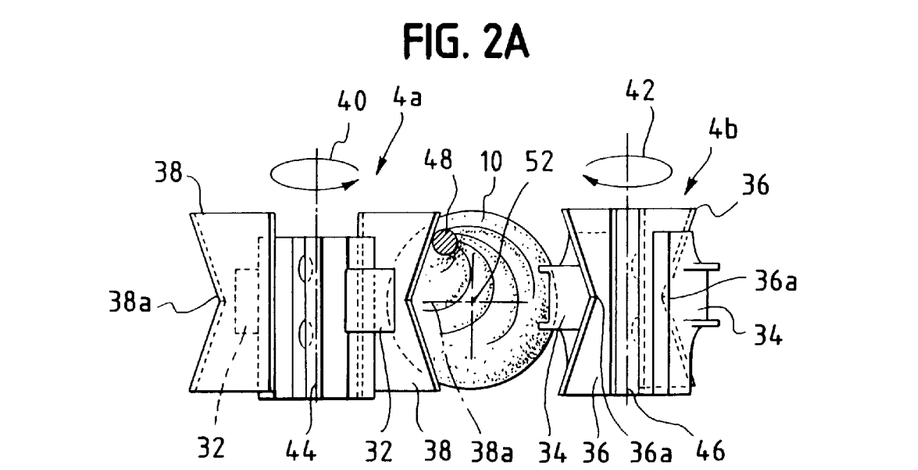
FIG. 2a shows a sectional view of the same detail of FIG. 1a seen in the direction of another sausage strand.
Figure 2B:
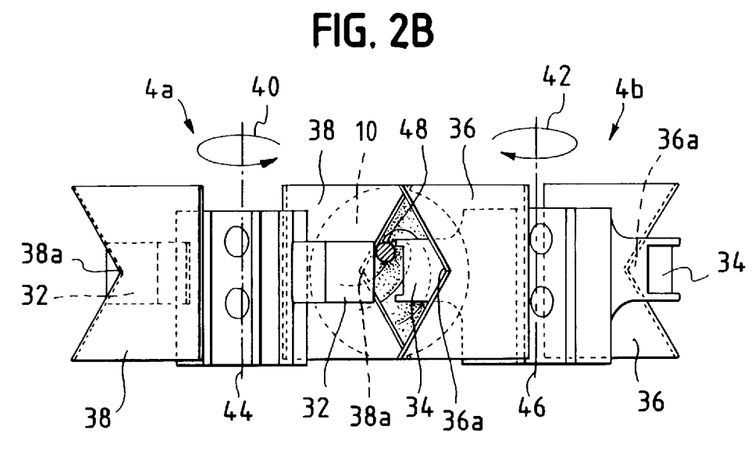
FIG. 2b shows the same view as FIG. 2a at a later time.
Figure 2C:
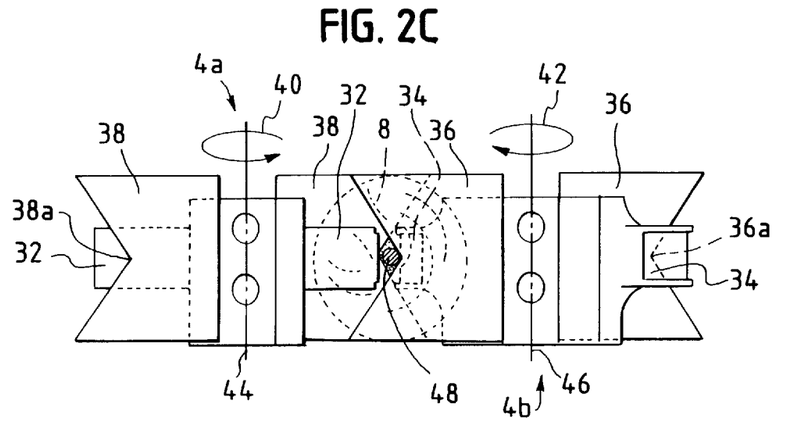
FIG. 2c shows the same view as FIG. 2a at a still later time.

In FIG. 1a to 1c, the separation process for a separation point 50 according to FIG. 6 is shown in a schematic top view. FIG. 2a to 2c, however, show the separation process for a separation point 48 according to FIG. 7 in the direction of the moving sausage strand. FIG. 1a to 1c and 2a to 2c show respective corresponding instantaneous views.

4a and 4b designate separation heads on either side of the sausage strand. The separation head 4a consists of two first separation elements 5a and 5b, whereas the second separation head 4b consists of two second separation elements 5c and 5d. The second separation head 4b comprises two blades 34 whose cutting edges are oriented parallel to the axle 46 of said separation head 4b. The separation head 4b rotates about the axle 46 in the direction 42 indicated. The forming elements 36, which are oriented parallel to the blades 34, are located behind said blades 34, when seen in the direction of movement. In the direction of movement 40 of the separation head 4a, the blades 34 are additionally provided with a concave surface 35 which is provided for treating the sausage with care during engagement.

The separation head 4a comprises two countersupports 32 extending radially away from the axle 44 and serving as countersupports for the blades 34 during the cutting process.

Second forming elements 38 extending substantially parallel to the longitudinal orientation of the countersupports 32 are located in front of said countersupports 32, when seen in the direction of movement 40. The forming elements 38 and the forming elements 36 partly extend beyond the countersupports 32 and the blades 34, respectively.

The direction of movement of the sausage strand is designated by reference numeral 24. Reference numeral 50 designates a separation point between the sausages 10, which has not not yet been drawn apart in FIG. 1a and which has been drawn apart partly in FIG. 1b.

FIG. 1c shows two sausages 8 which have just been cut apart by a blade 34 and a countersupport 32. During the cutting process, the individual sausages 8 are located at a distance 54 from one another, said distance 54 being maintained by the forming elements 36 and 38 at the separation point 50 and its order of magnitude being e.g. 10 to 15 mm.

FIG. 2a shows a side view of the separation heads 4a and 4b in the same condition of the sequence of movements which is shown in a top view in FIG. 1a, but with a sausage strand in which the turn-off point 48 is displaced relative to the axis 52 of the sausage strand. Also FIG. 2b and 2c show the same conditions of the -sequence of movements of the separation heads 4a and 4b which are shown in FIG. 1b and 1c in a view along the direction of movement of the sausage strand for a sausage strand with displaced separation points 48 according to FIG. 7.

In FIG. 2a to 2c, the V-shaped centering areas 36a and 38a of the forming elements 36 and 38 can be seen.

Figure 3A:
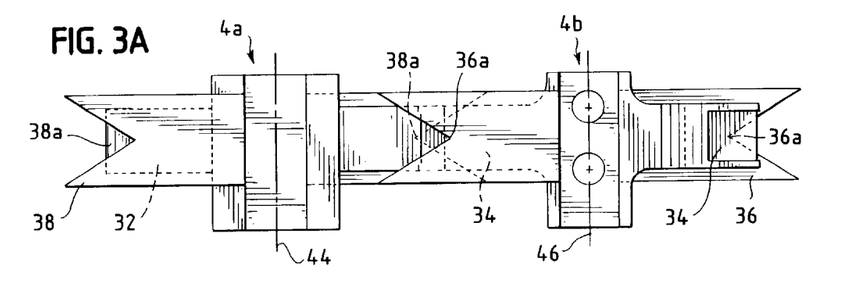
FIG. 3a shows an embodiment of a separation device seen in the direction of movement of a sausage strand.
Figure 3B:
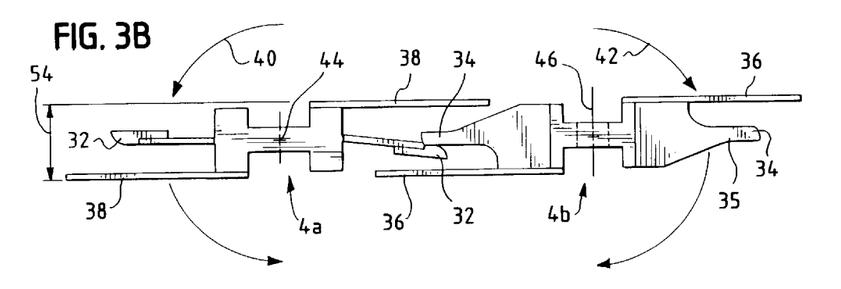

FIG. 3b shows in detail how the countersupports 32 are resiliently supported so that they can bend back in a direction opposite to the direction of movement 40 of the first separation head 4a. During the engagement of a blade 34 with such a countersupport 32, the countersupport 32 slightly bends back so as to guarantee a frictionless rotation of the separation heads 4a, 4b. In other embodiments, it is also possible to use a non-resilient countersupport.

In the above-described embodiment, the respective forming elements 36, 38 are one-piece components.

Figure 4A:
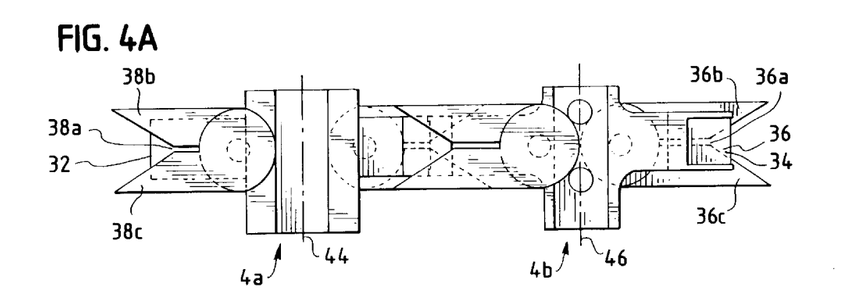
Figure 4B:
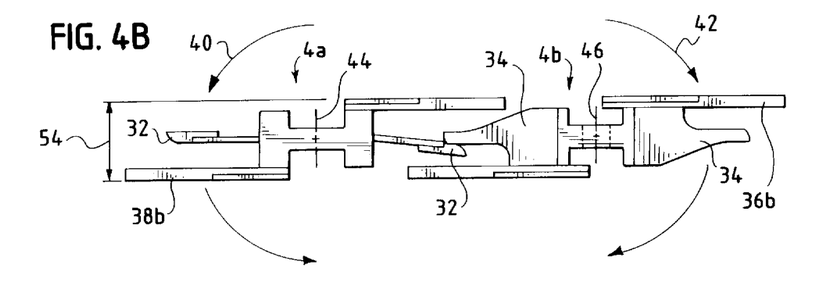
FIG. 4b shows a top view of the same embodiment.
Figure 4C:
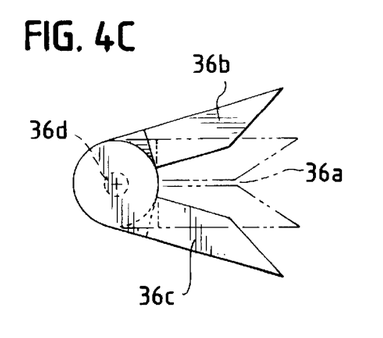
FIG. 4c shows a detail of the second embodiment in which the centering vanes can be seen.

In FIG. 4a to c, a further embodiment is shown in the case of which the forming elements 36 consist of individual centering vanes 36b and 36c, which are adapted to be adjusted about an axle 36d so as to change the size of the V-shaped area 36a, as indicated in FIG. 4c by solid lines and dot-and-dash lines, respectively. Also the individual centering vanes 38b and 38c of the forming element 38 can be adjusted so as to vary the V-shaped area 38a.

The method according to the present invention is carried out by the device according to the present invention as follows: sausage meat is introduced through the hopper 28 into the stuffing machine main unit 30. The vane pump, which is not shown, pushes the sausage meat through the charging pipe 20 in a direction 22. In the course of this process, a sausage skin applied to the charging pipe is stuffed in a known manner and, in so doing, simultaneously removed from the charging pipe 20. The skin material filled with the sausage meat is taken hold of by the endless belts 6 of the dimensioning unit 14, said endless belts 6 being driven by pulleys 7 in a direction 24. When a portion of sausage meat corresponding to one sausage has been ejected, the ejection of stuffing material is stopped or decelerated in synchronism with the endless belts 6. The stuffed part of the removed skin material is held by the endless belts 6, while the charging pipe 20 together with the still unstuffed part of the skin material applied to said charging pipe are being rotated by the twist-off mechanism 18. In this way, a separation point 50, 48 is produced by twisting off. In order to guarantee that the skin material is sufficiently taut, a brake ring mechanism 16, which is not of interest in the present connection, is provided. The timing of the movements of the vane pump in the stuffing machine main unit 30, of the twist-off mechanism 18, of the brake ring mechanism 16 and of the endless belts 6 is effected by a control means 25 which transmits respective electric signals to the individual components in a manner which is not of interest in the present connection.

The sausage-strand portions which have been twisted off so as to form individual sausages are moved past the separation device 2 by the endless belts 6, the separation heads 4 of said separation device being introduced between the endless belts from the side. The motor 2a of the separation device 2, which drives the two separation heads 4a and 4b, is also driven by the control means 25 so as to carry out a corresponding synchronous movement. As will be described herein-below, the separation heads 4a, b separate the sausage strand at the separation points 50, 48 so that individual sausages 8 are formed, which are advanced by the endless belts 6 until they drop into a storage bin at the end of the dimensioning unit 14 or until they are further processed.

When the separation elements 5a, 5b, 5c, 5d of the separation heads 4a, b come into contact with one another, this will result in the condition of FIG. 1a. The control means 25 guarantees that the speed of movement 24 of the sausages 10 corresponds to that of the tangential movement of the outer areas of the separation elements or that said movement of the sausages is adapted to the product in some other predetermined manner. First, a first forming element 38 of the separation element 5b and blade 34 of the separation element 5c come into contact with the leading sausage to be separated 10. The concave indentation 35 of the blade 34 and the leading surface of the forming element 38 are now pressed against the leading sausage 10. The continued rotary movement of the separation heads 4a and 4b in directions 40 and 42, respectively, and the simultaneous linear movement 24 of the sausage strand 10 result in a condition, which is shown in FIG. 1b. The first forming element 38 and the second forming element 36 draw the sausages to be separated 10 apart so that the separation point 50 is extended. FIG. 1c shows the device at the moment at which the cut is carried out. The separation point 50 is cut through by the blade 34 against the countersupport 32. While said cut is being performed, the forming elements 38 and 36 hold the sausages to be separated at a defined distance 54 from one another. In this way individual sausages 8 are formed. The individual sausages 8 are advanced in a direction 24, while the separation heads 4a and 4b continue to rotate in directions 40 and 42 so that the separation elements 5b and 5c move away from each other. Following this, the separation elements 5a and 5d interengage due to the rotary movements 40 and 42 so as to cut through the next separation point 50.

Whereas FIG. 1a and 1c show the separation process on the basis of a separation point 50 where the distance between the two sausages at the separation point is too short, this kind of separation point being shown in FIG. 6, FIG. 2a to 2c show the same sequence of steps, but for a sausage strand with off-center separation points 48.

In FIG. 2a, it can be seen how a first forming element 38 begins to interact with the separation point 48. When the rotary movement 40 of the first separation head 4a and the rotary movement 42 of the second separation head 4b as well as the movement of the sausage strand are continued, the off-center separation point 48 will be moved along the V-shaped area 38a in the direction of the axis 52 of the sausage strand, as can be seen in FIG. 2b. At the moment at which the cut is carried out, which is shown in FIG. 2c, the separation point 48 is located directly on the axis 52 of the sausages 8. The V-shaped areas 36a of the second forming elements 36 produce the same effect as the V-shaped areas 38a of the first forming elements 38, if the separation point 48 is displaced in the other direction relative to the axis 52.

Deviating from the embodiment described, other centering areas, e.g. U-shaped areas, can be provided instead of the V-shaped areas.

The separation heads 4a and 4b can rotate at a uniform speed. Depending on the speed of the sausage strand and the distance of the separation points, it may, however, be necessary that the control means 25 changes the angular speed of a separation head 4a, 4b during a rotation of said separation head. For example, if the sausages in question are sausages of greater length, which are transported by the endless belts 6 at high speed, the rotational speed of the separation heads 4a, 4b will be adapted to the speed of the sausage strand only during the period of time in which the separation elements are in contact with the sausage strand, whereas in the period of time in which no separation element is in contact with the sausage strand, a lower rotational speed will be chosen so as to be able to separate longer sausages.

Deviating from the embodiments of FIG. 1 to 3, FIG. 4 shows an embodiment in the case of which the V-shaped centering areas 38a, 36a of the forming elements 36, 38 can be adjusted. Prior to starting the sausage-stuffing operation, the centering vanes 36b, 36c are adjusted about the axle 36d in such a way that they correspond to the size of the sausages and to the lateral dimensions of the separation points. In this way, one and the same sausage machine can be used for sausages of different thicknesses.

It follows that the device according to the present invention and the method according to the present invention permit, especially also in the case of sensitive natural sausage casings, a separation of sausage strands whose separation points are either located very close to one another or not drawn apart at all. Due to the leading and trailing forming elements 38, 36, a constant distance of the individual sausages during the cutting process is guaranteed. An embodiment with suitable centering areas can additionally be used in an advantageous manner for sausage strands with off-center separation points.

We claim:

1. A separation device for separating sausages at separation points formed between individual sausages of a sausage strand, comprising in combination:

a transport means for the sausage strand provided with at least one first separation element on a first side of the sausage strand and at least one second separation element on the second side of the sausage strand, said separation elements being driven such that they circulate in opposite directions on circular paths about a first and a second axle, which extend at right angles to the direction of transport of the sausage strand, and being arranged such that, while circulating, said first and second separation elements cooperate such that the sausage strand is cut through at the separation points, a first forming element (38) circulates together with said first separation element (5a, 5b), said first forming element (38) preceding said first separation element (5a, 5b) on its circular path (40), and a second forming element (36) circulates together with said second separation element (5c, 5d), said second forming element (36) following said second separation element (5c, 5d) on its circular path (42), whereby said first and second forming elements (38; 36) hold the sausages to be separated (10) a desired distance (54) during engagement of said first and second separation elements.

2. A device according to claim 1, wherein one of either said first (5a, 5b) or said second separation element (5c, 5d) comprises a blade (34) and that the respective other said separation element comprises a countersupport (32).

3. A device according to claim 2, wherein said blade (34) is provided with a concave indentation (35) on the leading side thereof.

4. A device according to claim 1, wherein both said first and said second separation element comprise a blade.

5. A device according to claim 2 or 3, wherein said countersupport (32) is elastic or resiliently supported.

6. A device according to claim 1, wherein said forming elements (36; 38) comprise platelike elements which extend substantially parallel to a line extending through the center of the circular path of the respective said separation element.

7. A device according to claim 1, wherein said forming elements (36; 38) comprise essentially V-shaped centering areas (36a; 38a), which open in the direction of the sausage strand, at their ends located remote from said axle, said centering areas (36a; 38a) causing said separation point (48) to be centered during engagement of said first (5a, 5b) and said second (5c, 5d) separation elements.

8. A device according to claim 1, wherein said forming elements (36; 38) are each implemented as a one-piece component.

9. A device according to claim 7, wherein each of said forming elements (36; 38) consists of adjustable centering vanes (36b, 36c; 38b, 38c) including a variable angle between them, said variable angle defining said V-shaped centering area (36a; 38a).

10. A device according to claim 1, and a drive means (2a) for said separation elements (5a, 5b, 5c, 5d), which is speed-controllable during a rotation, and by the associated said forming elements (38, 36).

11. A device according to claim 10, wherein said separation elements (5a, 5b, 5c, 5d) are driven such that, in the area of engagement with the sausage strand, they move at a speed which is adpated to the speed of said transport means (6, 7).

12. A device according to claim 1, wherein on either side of the sausage strand to be conveyed, two said separation elements (5a, 5b; 5c, 5d) and the respective said forming elements (38; 36) are provided, which circulate about a common axle (44; 46).

13. A method of dividing sausage strands at separation points into individual sausages or chains of sausages comprising identical numbers of sausages, comprising the steps of moving the sausage strand into contact with a separation device and cutting through a separation point between two sausages by engagement of circulating separation elements, said separation point being drawn apart to a desired distance in a simultaneous operating step by forming elements circulating together with said separation elements.

14. A method according to claim 13, and, while being drawn apart, the separation point (48, 50) is centered along the longitudinal axis (52) of the sausage strand.

* * * * *

UNITED STATES PATENT AND TRADEMARK OFFICE
CERTIFICATE OF CORRECTION

PATENT NO. : 6,045,445
DATED : April 4, 2000
INVENTOR(S) : Karl Hummel et al

It is certified that error appears in the above-indentified patent and that said Letters Patent is hereby corrected as shown below:

Column 8, line 62, "adpated" should be --adapted--.

Signed and Sealed this

Tenth Day of April, 2001

Attest:

NICHOLAS P. GODICI

Attesting Officer     Acting Director of the United States Patent and Trademark Office